United States Patent [19]

Nishikawa et al.

[11] 4,154,317
[45] May 15, 1979

[54] POWER STEERING APPARATUS FOR A VEHICLE

[75] Inventors: Masao Nishikawa, Tokyo; Yoshihiko Toshimitsu; Takashi Aoki, both of Asaka, all of Japan

[73] Assignee: Honda Giken Kogyo Kabushiki Kaisha, Tokyo, Japan

[21] Appl. No.: 859,112

[22] Filed: Dec. 8, 1977

[30] Foreign Application Priority Data

Dec. 17, 1976 [JP] Japan .................. 51-150773

[51] Int. Cl.$^2$ ............................... B62D 5/08
[52] U.S. Cl. ..................... 180/143; 91/434
[58] Field of Search .............. 180/143, 141, 142; 91/434, 371, 372, 370, 373

[56] References Cited
U.S. PATENT DOCUMENTS 3,994,361  11/1976  Nishikawa .................. 180/143

Primary Examiner—Joseph F. Peters, Jr.
Assistant Examiner—R. Schrecengost
Attorney, Agent, or Firm—Haseltine, Lake & Waters

[57] ABSTRACT

A power steering apparatus for a vehicle comprising a center open type changeover valve which, on turning of a steering shaft, is moved to be changed over from a neutral straight running position to either of left and right steering positions so that an oil supply passage connected to an operation oil pressure source and an oil discharge passage connected to a return tank are selectively and respectively connected to the left and right chambers of a power cylinder. On one side of the changeover valve is at least one oil pressure reaction chamber which is connected through an oil passage to the oil supply passage to urge the changeover valve to return to its neutral straight running position on the changeover movement of the changeover valve in either direction. The operation oil pressure source is so constructed to provide increased delivery amount according to increase of vehicle speed. A throttle is interposed in the oil supply passage downstream of the connecting point of the oil supply passage with the oil passage to the reaction chamber.

7 Claims, 4 Drawing Figures

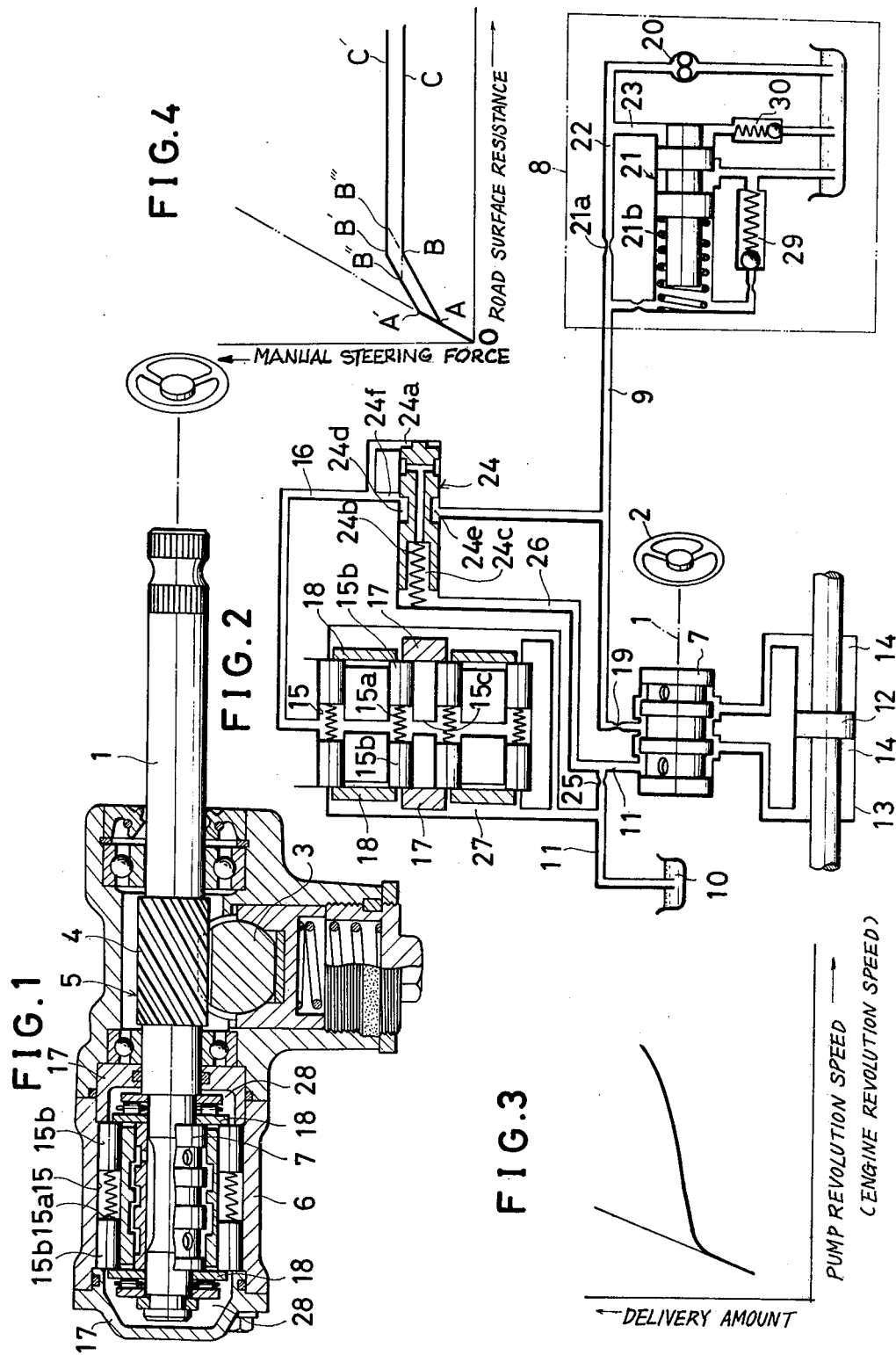

POWER STEERING APPARATUS FOR A VEHICLE

FIELD OF THE INVENTION

This invention relates to power steering apparatus for a vehicle, such as a motorcar or the like.

PRIOR ART

There has been known a type of power steering apparatus comprising a center open type changeover valve which, on turning of a steering shaft, is moved to be changed over from its neutral straight running position to either of left and right steering positions, so that an oil supply passage connected to an operation oil pressure source and an oil discharge passage connected to a tank are connected selectively to one or the other of left and right chambers of a power cylinder and consequently one of the chambers is supplied with pressure oil from the operation oil pressure source to furnish a predetermined power assistance to a manual steering operation; additionally there is provided on one side of the changeover valve at least one oil pressure reaction chamber which is connected through an oil passage to the oil supply passage and arranged to operate to return the changeover valve to its neutral straight running position on the changeover movement of the changeover valve in either direction, and thus an oil pressure generated in the foregoing one side chamber and corresponding to a road surface resistance (the steering reaction force acting from the road surface to a wheel tire during the steering operation) is applied to the reaction chamber and consequently, the steering force is changed with the road surface resistance.

Additionally, there has been known an arrangement in the foregoing conventional apparatus, for preventing over-steering during high speed vehicle travel in which the oil supply passage is provided with a throttle control valve on the downstream side of a connecting portion thereof with the oil passage, said throttle control valve operating during high speed travel so that the oil pressure within the oil pressure reaction chamber is increased by a degree of such a differential pressure that is produced across the control valve, for increasing the steering force during high speed travel. This arrangement, however, is deficient in that the throttle control valve requires a control member sensitive to vehicle speed, and also the valve is required to be interposed in the oil supply passage accurately in relation with the control member. Thus, the apparatus becomes complicated and the assembly thereof and other various operations, such as maintenance, inspection and the like become troublesome.

SUMMARY OF THE INVENTION

An object of this invention is to provide an apparatus free from the foregoing deficiencies.

According to the invention, this is achieved in an apparatus of the type in which there is provided a center open type changeover valve which, on turning of a steering shaft, is moved to be changed over from its neutral straight running position to either of left and right steering positions, so that an oil supply passage connected to an operation oil pressure source and an oil discharge passage connected to a tank are selectively connected to the left and right chambers of a power cylinder, and additionally there is provided on one side of the changeover valve at least one oil pressure reaction chamber which is connected through an oil passage to the oil supply passage and is operative to return the changeover valve towards its neutral straight running position on the changeover movement of the changeover valve in either direction, the invention being characteized in that the operation oil pressure source is so constructed as to be of the type in which the delivery amount is increased according to vehicle speed, and a throttle valve is so interposed in the oil supply passage to be located on the downstream side of a connecting portion of the oil supply passage with the oil passage to the reaction chamber.

BRIEF DESCRIPTION OF THE DRAWING

FIG. 1 is a sectional side view of one embodiment of the apparatus according to the invention.

FIG. 2 is a diagrammatic illustration of an oil pressure circuit of the apparatus.

FIG. 3 is a graph showing the characteristic of an operation oil pressure source.

FIG. 4 is a graph showing the steering characteristics of the apparatus.

DETAILED DESCRIPTION

Referring to the drawings, numeral 1 denotes a steering shaft of a vehicle and numeral 2 denotes a steering wheel mounted on the base end portion thereof. The steering shaft 1 is extended forwards and forms, in succession, a pinion shaft 5, which is rotatable with the shaft 1 and has a skew type pinion 4 in mesh with a skew type rack 3 mounted on one side thereof, and a changeover valve 7 which is slidable forwards and rearwards to be changed over within a valve housing 6 from its neutral straight running position to either of right and left steering positions located at the front side and the rear side by a longitudinal reaction force acting on the pinion shaft 5 on turning of the pinion 4.

The changeover valve 7 is of open center type, and when the valve 7 is in its neutral straight running position, it operates to connect an oil supply passage 9 connected to an operation oil pressure source 8 and an oil discharge passage 11 connected to a tank 10 and when the valve 7 is slidablymoved to be changed over to either of the respective steering positions, it operates in such a manner that either one of left and right chambers 14 of a power cylinder 13 having a piston 12 connected to the rack 3 is connected to the oil supply passage 9 while the other chamber is connected to the oil discharge passage 11, and thereby one chamber 14 is supplied with pressure oil from the operation oil pressure source 8 and oil in the other chamber 14 is discharged to the tank 10, while the piston 12 is being moved, and thus a predetermined power assistance can be given to a manual steering operation.

Numeral 15 denotes an oil pressure reaction chamber provided on one side of the changeover valve 7. The reaction chamber 15 is connected through an oil passage 16 to the oil supply passage 9, and is provided at the front and rear sides thereof with a pair of plungers 15b urged away from one another by an intermediate spring 15a, so that in normal condition (neutral straight running operation) the two plungers 15b are held between a pair of front and rear flanges 18 projecting from the changeover valve 7 under the condition that they are in abutment with a pair of front and rear closure members 17 of the valve housing 6. When the changeover valve 7 is moved to be changed over to either of the respective steering positions, one of the plungers 15b on either side is subjected, through the flange 8 on the corresponding side, to an inward sliding movement against both the action of the spring 15a and the oil pressure within the chamber 15, so that by the reaction thereof the changeover valve 7 is acted on by a reaction force urging the valve 7 to return to its neutral straight running position.

In the illustrated embodiment, four such reaction chambers 15 are provided, and these are interconnected through oil passage 15c.

Up to this point, the construction is not particularly different from the conventional arrangement.

According to this invention, the operation oil pressure source 8 is constructed to provide an increased delivery amount according to vehicle speed, while additionally a throttle or orifice 19 is interposed in the oil supply passage 9 on the downstream side of a connecting point of passage 9 with the oil passage 16.

More in detail, the operation oil pressure source 8 comprises an oil pressure pump 20 driven by the internal combustion engine and a flow rate adjusting valve 21 provided on the delivery side of pump 20, the adjusting valve 21 being interposed in a return passage 23 to the tank 10 branched from a delivery passage 22 of the oil pressure pump 20 so that the valve 21 may be opened to a predetermined open degree against the action of a spring 21b by a differential pressure produced across a throttle 21a interposed in the delivery passage 22. Thus, if the delivery amount to the oil supply passage 9 is increased, the differential pressure across the throttle 21a is increased and the valve 21 is increased in its open degree and thereby the amount of oil flowing through the return passage 23, that is, the leakage amount is increased. This means that the foregoing delivery amount is automatically compensated towards its decreasing side. It has been generally known that, in this case, if the spring constant of the spring 21b is set to a particular value, the delivery amount varies as shown by the heavy line in FIG. 3 according to the speed of rotation of the oil pressure pump 20, and accordingly, to engine speed which is in close relation to vehicle speed. By utilizing this fact, the delivery amount may be increased in relation to the vehicle speed.

Accordingly, if the delivery amount is increased, the differential pressure $\Delta P1$ produced across the throttle 19 interposed in the oil supply passage 9 is also increased according to increase of the vehicle speed, and in accordance therewith, the oil pressure acting on the oil pressure reaction chamber 15 connected to the upstream side of the throttle 19 is also increased.

Numeral 24 denotes a control valve interposed in the oil passage 16. The control valve 24 is provided at one end with an oil pressure chamber 24a connected to the oil pressure reaction chamber 15, at its other end with a spring chamber 24c containing a spring 24b, and at an intermediate portion with an annular groove 24d. Thus, in normal condition, the control valve 24 is in such an open valve condition that an inlet opening 24e at one side and an outlet opening 24f at the other side are in communication with each other through the intermediate annular groove 24d. However, the valve 24 is operated to move towards its closing side against the action of the spring 24b when a predetermined high pressure is produced within the oil pressure reaction chamber 15, and accordingly, within the oil pressure chamber 24a connected thereto.

In the illustrated embodiment, a throttle 25 is interposed in the oil discharge passage 11 connected to the changeover valve 7 and the upstream side of throttle 25 is connected through an oil passage 26 to the spring chamber 24c, so that a pressure with a differential pressure $\Delta P2$ produced across th throttle 25 can act on the control valve 24 to move the valve towards its opening side so that the oil pressure within the oil pressure reaction chamber 15 that is required for closing the valve 14 may be increased to this degree. Numeral 27 denotes a drain passage connecting front and rear opposite chambers 28 in the valve housing 6 to the oil discharge passage 11.

Numeral 29 denotes a relief valve provided in the operation oil pressure source 8 serving to prevent excess increase in the oil pressure, and numeral 30 denotes a check valve for preventing the oil pressure from becoming negative.

The operation of the apparatus is as follows:

At the time of straight running of the vehicle, that is, when the changeover valve 7 is in its neutral straight running position, the oil supply passage 9 and the oil discharge passage 11 are in communication with each other, and the oil from the operation oil pressure source 8 is discharged to the tank 10 through the thottle 19 in the oil supply passage 9 and the throttle 25 in the oil discharge passage 11. Thus, the oil pressure increased by the differential pressures $\Delta P1$, and $\Delta P2$ acts on the oil pressure reaction chamber 15 through the oil passage 16. At the opposite side, the force acting on valve 24 is the differential pressure $\Delta P2$ and the force of spring 24. If the force of spring 24 is greater than $\Delta P1$ the valve remains opened.

If, now, the steering shaft 1 is turned in one direction or the other, the pinion shaft 5 is turned and thereby the rack 3 and the piston 12 connected to the rack 3 are moved in one direction, and if the longitudinal reaction force acting on the pinion shaft 5 becomes large enough to move the changeover valve 7 against the foregoing oil pressure and the springs 15a which act in the oil pressure reaction chambers 15, the changeover valve 7 is moved to the steering position on one side, and, as described before, one side chamber 14 of the power cylinder 13 will be supplied with pressure oil from the operation oil pressure source 8 and the piston 12 is moved in said one direction, so that a power assistance is given to the manual steering operation.

On this occasion, an oil pressure corresponding to a road surface resistance is generated in said one side chamber 14, and that oil pressure is supplied to the oil pressure reaction chamber 15 while being increased by the amount of the differential pressure $\Delta P1$ produced at the throttle 19 interposed in the oil supply passage 9 and acts to move back the changeover valve 7 towards its straight running position. This means that the force for holding the changeover valve 7 in the foregoing steering position, and accordingly, the steering force is varied depending on the road surface resistance.

When the oil pressure within the oil pressure reaction chamber 15 increases to reach a predetermined value in proportion to increase in the road surface resistance, the control valve 24 is closed against the oil pressure and spring 24b within the spring chamber 24c, so that any further increase in the oil pressure is prevented.

Thus, the change of the steering force varies as shown at O-A B-C in FIG. 4.

Here, the bend point A is determined by the intensity of the oil pressure and of the spring 15a which act within the oil pressure reaction chamber 15 where the changeover valve 7 is in its straight running position. Accordingly, as the vehicle speed is increased, the delivery amount from the operation oil pressure source 8 is increased and consequently the differential pressures Δ P1 and Δ P2 produced at the two throttles 19, 25 are increased, and thus the oil pressure acting in the oil pressure reaction chamber 15 is also increased. Accordingly, if it is assumed that the bend point A corresponds to low speed travel, the point A moves up to A' at the time of high speed travel, and thus the steering force is increased.

The bend point B is determined by the oil pressure within the oil pressure reaction chamber 15 that is produced at the moment when the control valve 24 is closed, and in turn, by the intensity of the oil pressure and that of the spring 24b within the spring chamber 24c which are acting to keep the control valve 14 in its open position.

Here, the oil pressure within the spring chamber 24c is equal to the differential pressure Δ P2 produced at the throttle 25 interposed in the oil discharge passage 11, and the differential pressure Δ P2 is increased in relation to increased discharge amount to the oil discharge passage 11 due to increased delivery amount from the operation oil pressure source 8. Accordingly, at the time of high speed travel, the bend point B moves up to B', and thus the steering characteristic curve at the time of high speed travel is shown by O-A'-B'-C' in FIG. 4.

If, in this case, the control valve 24 were not provided, the steering force would continuously increase with increase in the road surface resistance. Thus, this would make the steering operation difficult at the time of low speed travel with large road surface resistance.

The provision of the control valve 24 makes the steering operation easy at such time. However, if consideration is given to the danger caused by oversteering at the time of high speed travel, it is always desirable that the steering force always be increased in response to the road surface resistance. Accordingly, by raising the bend point B to the point B' as mentioned above, the range B'-C' of the steering characteristic is transferred to a level above a steering force usually generated by such a road surface resistance range at the time of steering during high speed travel.

If it is so designed that the control valve 24 may be pushed to its open side by the spring 24b alone, the control valve 24 will be closed by the same steering force as the force value at the bend point B, so that the steering characteristic curve at the time of high speed travel becomes O-A'-B"-C. If it is so designed, in case the road resistance is decreased as the vehicle speed is increased, there is such a possibility that the steering characteristics may fall in the range B"-C. Accordingly, it becomes necessary in this case that the bend point B at the time of low speed travel moves up to point B''' by strengthening the spring 24b.

In the foregoing embodiment, the oil pressure source 8 is so constructed that the delivery amount thereof is varied with engine speed which is related to vehicle speed, but the engine speed need not be limited thereto and the arrangement can be modified so that the vehicle speed is accurately detected and the delivery amount of the source is varied according to the detected value.

Further, the changeover valve 7 is not limited to be one of sliding movement type as shown, but valve 7 may be of rotary movement type.

According to this invention, the oil pressure source is constructed so that the delivery amount is increased in proportion to vehicle speed, and a differential pressure proportional to vehicle speed is generated at the throttle interposed in the oil supply passage and thereby the steering force is increased in relation to vehicle speed. Accordingly, the throttle does not require any control member as in the throttle control valve in the conventional arrangement, and thus the throttle can be simple in construction. Additionally, the operation oil pressure source can be constructed to be simply of vehicle speed responsive type, and thus the deficiencies in the conventional arrangement can be removed.

What is claimed is:

1. In power steering apparatus for a vehicle having a center open type changeover valve mounted for movement between a neutral straight travel position and operative positions corresponding to left and right steering positions, an oil pressure source, a return tank, an oil discharge passage, an oil supply passage connected to said source and said changeover valve, a power cylinder having left and right chambers and a piston, said chambers being connected to said changeover valve for selective connection thereby to said oil supply passage and said oil discharge passage depending upon movement of said changeover valve to said steering to said steering positions, at least one reaction chamber, and an oil passage connecting said oil supply passage to said reaction chamber to pressurized the latter and urge the changeover valve back to neutral position, the improvement wherein said oil pressure source includes means for increasing the delivery amount of oil in relation to vehicle speed, and a throttle in said oil supply passage downstream of the connection of said oil supply passage to the oil passage to the reaction chamber, control means in said oil passage for closing said passage in dependence on the oil pressure in said reaction chamber, a further throttle in said oil discharge passage, and a further oil passage connecting said oil discharge passage at a location upstream of said further throttle with said control valve means for supply of oil thereto urging said control valve means to open position.

2. The improvement as claimed in claim 1 comprising spring means urging said control valve means to open position.

3. The improvement as claimed in claim 1 wherein said means in said oil pressure source comprises a pump, a return passage from said oil supply passage to said return tank, and flow rate adjusting valve means in said return passage for controlling return flow to said tank in relation to increased oil pressure.

4. The improvement as claimed in claim 3 wherein said flow rate adjusting valve means comprises a slidable valve having opposite ends with chambers thereat, one chamber being connected to the return passage, the other chamber to the oil supply passage.

5. The improvement as claimed in claim 4 comprising a further throttle in the oil supply passage located between the passages connected to the chambers of the slidable valve of the flow rate adjusting valve means.

6. The improvement as claimed in claim 5 comprising means in said other chamber resiliently biassing said slidable valve to closed position.

7. The improvement as claimed in claim 6 wherein said chamber associated with said return passage is disposed in opposition to the resilient biassing means so that differential pressure applied to said chambers due to said further throttle acts to open said slide valve and increase return flow from the pump to said tank.

* * * * *